United States Patent
Delmas et al.

(10) Patent No.: US 9,185,630 B2
(45) Date of Patent: Nov. 10, 2015

(54) MANAGEMENT OF THE CONNECTIONS OF RELAY NODES TO FORM AN AD HOC NETWORK

(75) Inventors: Serge Delmas, Plaisir (FR); Christine Helias-Foret, Montigny le Bretonneux (FR); Christophe Gruet, Montigny le Bretonneux (FR); Gérard Marque-Pucheu, Verneuil (FR)

(73) Assignee: CASSIDIAN SAS, Elancourt (FR)

( * ) Notice: Subject to any disclaimer, the term of this patent is extended or adjusted under 35 U.S.C. 154(b) by 396 days.

(21) Appl. No.: 13/696,223

(22) PCT Filed: May 12, 2011

(86) PCT No.: PCT/EP2011/002359
§ 371 (c)(1),
(2), (4) Date: Nov. 29, 2012

(87) PCT Pub. No.: WO2011/141177
PCT Pub. Date: Nov. 17, 2011

(65) Prior Publication Data
US 2013/0235758 A1      Sep. 12, 2013

(30) Foreign Application Priority Data

May 12, 2010 (FR) ...................................... 10 02031

(51) Int. Cl.
*H04L 12/66* (2006.01)
*H04W 40/30* (2009.01)
(Continued)

(52) U.S. Cl.
CPC ............. *H04W 40/30* (2013.01); *H04B 7/2606* (2013.01); *H04W 40/246* (2013.01); *H04B 7/155* (2013.01); *H04W 84/18* (2013.01)

(58) Field of Classification Search
CPC ......... H04L 41/12; H04L 45/02; H04L 45/00; H04L 45/04; H04L 41/04
USPC .................... 370/254, 236, 252, 229
See application file for complete search history.

(56) References Cited

U.S. PATENT DOCUMENTS 5,949,760 A * 9/1999 Stevens et al. ................ 370/254
6,256,295 B1 * 7/2001 Callon ........................... 370/254
(Continued)

FOREIGN PATENT DOCUMENTS

| EP | 1624626 A2 | 2/2006 | |
| WO | WO 2009/064931 A1 | 5/2009 | |
| WO | WO 2009135516 A1 * | 11/2009 | ............... H04L 5/00 |

OTHER PUBLICATIONS

JJ Garcia-Luna-Aceves, IEEE and Jochen Behrens, IEEE, "Distributed, Scalable Routing Based on Vectors of Link States", 00-09-1994, University of California Dept of Computer Engineering, public release, p. 1.*

(Continued)

*Primary Examiner* — Hassan Phillips
*Assistant Examiner* — Siren Wei
(74) *Attorney, Agent, or Firm* — Miller, Matthias & Hull LLP

(57) ABSTRACT

The invention relates to a relay node capable of managing the establishment of a fixed number of connections to detected neighboring relay nodes in order to form an ad hoc network with wide coverage. The relay node comprises a means for classifying the neighboring relay nodes according to a parameter, a means for selecting a fixed number of first classified neighboring relay nodes and means for establishing connections between the selected neighboring relay nodes and said relay node. The relay node also comprises a means for upgrading, before the selection of the fixed number of first neighboring relay nodes, the neighboring relay nodes determined as being non-accessible or accessible with upgrading in the ad hoc network from said relay node to make them able to be selected.

10 Claims, 4 Drawing Sheets

(51) Int. Cl.
  *H04B 7/26* (2006.01)
  *H04W 40/24* (2009.01)
  *H04B 7/155* (2006.01)
  *H04W 84/18* (2009.01)

(56) References Cited

U.S. PATENT DOCUMENTS

| 6,456,599 | B1 * | 9/2002 | Elliott | 370/254 |
| 2007/0105575 | A1 * | 5/2007 | Sampath et al. | 455/509 |
| 2008/0049672 | A1 * | 2/2008 | Barak et al. | 370/330 |
| 2009/0010199 | A1 * | 1/2009 | Adachi et al. | 370/315 |
| 2009/0046601 | A1 | 2/2009 | Nordmark et al. | |
| 2009/0175208 | A1 | 7/2009 | Thubert et al. | |
| 2010/0020740 | A1 | 1/2010 | Watanabe et al. | |
| 2011/0243074 | A1 * | 10/2011 | Shin et al. | 370/329 |

OTHER PUBLICATIONS

International Search report from corresponding PCT Application No. PCT/EP2011/002359 Report Dated Aug. 9, 2011.

* cited by examiner

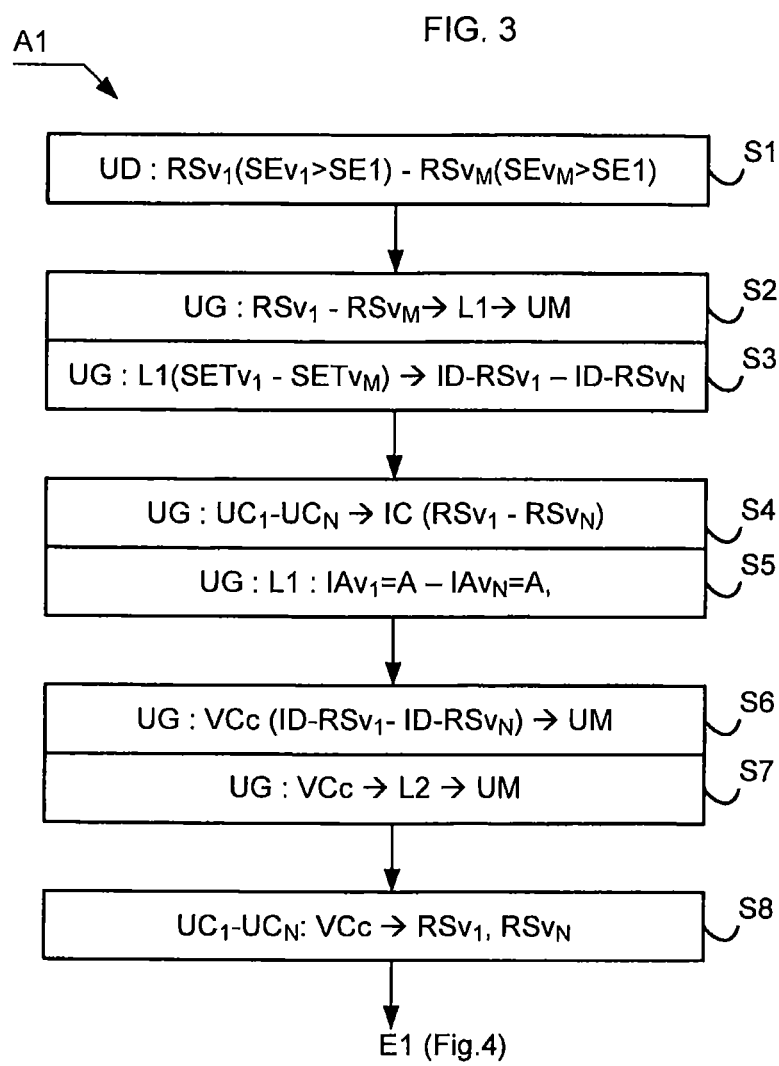

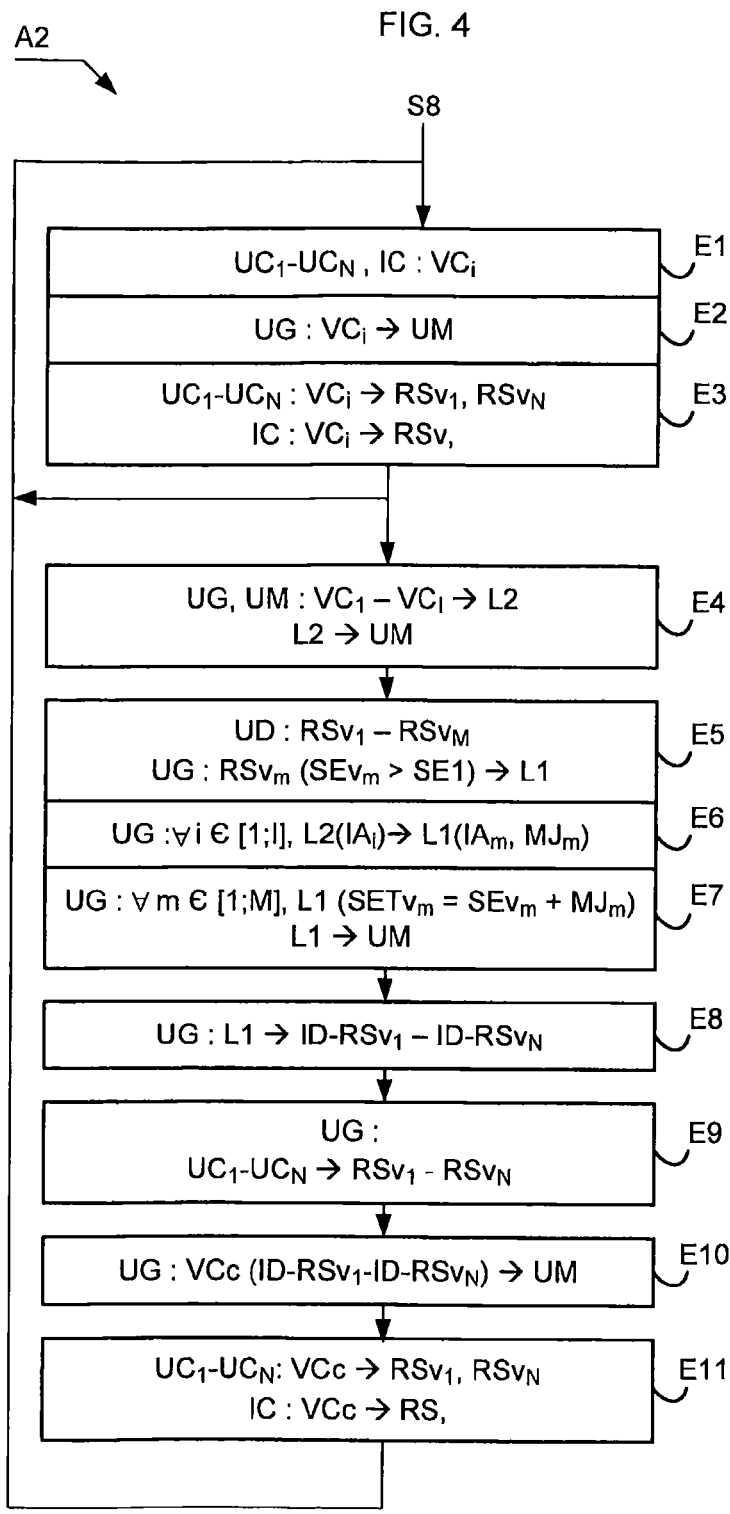

MANAGEMENT OF THE CONNECTIONS OF RELAY NODES TO FORM AN AD HOC NETWORK

CROSS-REFERENCE TO RELATED APPLICATIONS

This application is a 35 USC §371 U.S. national stage filing of International Patent Application No. PCT/EP2011/002359 filed on May 12, 2011, which claims priority under the Paris Convention and 35 USC §119 to French Patent Application No. 10 02031, filed on May 12, 2010.

FIELD OF THE DISCLOSURE

The present invention relates to a management of the connections of relay nodes to form an ad hoc network. More particularly, the invention describes a management in a relay node of the connections to be established with other neighbouring relay nodes. The invention is applicable in the rapid deployment of an ad hoc-type network used by emergency service professionals such as firefighters, police or even military forces in interventions on a site with no secured network infrastructure.

BACKGROUND OF THE DISCLOSURE

Ad hoc networks are wireless, spontaneous networks, that do not require the presence of any fixed infrastructure and that are capable of being dynamically organized without the intervention of the users. The presence of terminals, also called nodes, equipped with a radio interface, whether they are microcomputers, personal digital assistants, devices mounted in vehicles or even sensors, is sufficient to be able to create an ad hoc network. In an ad hoc mobile network, consisting of nodes provided with a radio communication interface, a node of the network can communicate directly with its neighbours, that is to say, those which are within range of its own interface, and serves as router for the other mobile nodes of the networks. A new node arriving in the network must make itself known to the rest of the network and discover the topology of the network. For this, it announces itself to the neighbouring nodes of the network by broadcasting one or more information items defining it which are conveyed from node to node. It receives, by listening to the network, information items defining the other nodes forming the network and thus establishes the topology of the network. This type of network is particularly useful when no wired connection is available, for example in interventions on the site of a disaster and, more generally, for the rapid deployment of a network.

SUMMARY OF THE DISCLOSURE

The invention is based on a known proactive routing protocol enabling each node to know the topology of the network. In such a protocol, routing tables define respectively for each node the paths linking the nodes of the network that it can reach. These routing tables are automatically constructed in each of the nodes of the network and make it possible to identify the topology of the network at all times.

Many works on proactive routing protocols for a mobile ad hoc network, called MANET ("Mobile Ad hoc NETworks"), have been validated by the international work group IETF (Internet Engineering Task Force) which participates in the creation of standards for the Internet. These works concern in particular the following routing protocols:

- the NHDP (NeighbourHood Discovery Protocol), which is a protocol for discovering the neighbouring nodes of the network via the exchange of routing tables between each of the nodes of the network,
- the OLSR (Optimized Link State Routing Protocol), which is a protocol for optimizing the connections between nodes, among which some nodes are elected to transmit the routing tables, and
- the TBRPF (Dissemination Based on Reverse-Path Forwarding), which is a routing protocol in which only the modifications—and not all of the routing table—are exchanged between the nodes.

Considering the practical cases of ad hoc networks on the ground, the number of connections that can be established for each node with other nodes of a network is limited. Thus, a first set of nodes forming a first ad hoc network may be isolated from another set of nodes forming a second ad hoc network. This is due in particular to a poor management of the connections between the nodes, through the use of the known protocols.

The aim of the invention is to establish, for each node, the connections that are the most relevant in order to form an ad hoc network that has a wide network coverage.

On sites with risks, such as natural disasters or military operations, it is not always possible to connect an ad hoc network to, for example, a fixed network infrastructure. The safety of the citizens and/or of the military personnel depends on the communications between the users of the network. Consequently, the connectivity of the network must be optimized to be as wide as possible. This optimisation is implemented in each relay node of the network by a method for managing the establishment of a fixed number of connections between detected neighbouring relay nodes in order to form an ad hoc network with wide coverage, the method being implemented in each current relay node and comprising a classification of the neighbouring relay nodes according to a specific parameter, a selection of the fixed number of first classified neighbouring relay nodes and an establishment of the connections between the selected neighbouring relay nodes and the current relay node. The method comprises, before the selection of the fixed number of first neighbouring relay nodes, an upgrading of the neighbouring relay nodes identified as being non-accessible or accessible with upgrading in the ad hoc network from the current relay node to make them able to be selected.

According to one characteristic of the invention, the specific parameter comprises a spectral efficiency specific to each neighbouring relay node measured by the current relay node and according to which the upgrading of the neighbouring relay nodes identified as being non-accessible or accessible with upgrading comprises an uprating of their respective measured spectral efficiencies by adding a given value.

According to another characteristic of the invention, in each current relay node, a link state vector is constructed and comprises at least identities of the neighbouring relay nodes with which the current relay node has established connections, and comprises, for each neighbouring relay node, a network accessibility of said node considered from the current relay node, the link state vector being transmitted to the other relay nodes of the network via the selected and connected neighbouring relay nodes. According to the proactive routing protocol, a routing table transmitted from node to node contains the link paths that make it possible to reach another node in the network from a particular node. The map of the network is defined in the routing table. The node refers to the routing table to reach another node. In a different manner, according to the invention, each relay node transmits to all the other nodes of the network the identities of the neighbouring relay nodes with which it is connected. Based on the received link state vectors, each node constructs its own map of connectivity between all the nodes of the network and therefore its own routing table. Thus, when a relay node has to contact another relay node of the network, it determines, on the basis of the link state vectors of the nodes of the network, the best link path to reach it.

According to another characteristic of the invention, each current relay node identifies a network accessibility for each neighbouring relay node based on an analysis of the link state vectors of relay nodes forming the ad hoc network, received and validated by the current relay node, and of the link state vector constructed by the current relay node, a neighbouring relay node being identified as:

non-accessible from the current relay node if the identity of the neighbouring relay node is not included in any of the analysed link state vectors, accessible from the current relay node, if the vector of the neighbouring relay node is analysed by the current relay node, or if, in at least one of the vectors analysed by the current relay node, the network accessibility of the neighbouring relay node indicates the said node as being accessible, or if, in the link state vector of the current relay node, the network accessibility of the neighbouring relay node indicates the said node as being non-accessible and, in at least one of the other received link state vectors, the network accessibility of the neighbouring relay node indicates the said node as being accessible with upgrading, or accessible with upgrading from the current relay node, if, in the link state vector of the current relay node, the network accessibility of the neighbouring relay node indicates the said node as being accessible with upgrading and, in the other received link state vectors, the network accessibility of the neighbouring relay node indicates the said node as being non-accessible or accessible with upgrading.

The invention also relates to a relay node capable of managing the establishment of a fixed number of connections to detected neighbouring relay nodes in order to form an ad hoc network with wide coverage, and comprising a means for classifying the neighbouring relay nodes according to a specific parameter, a means for selecting a fixed number of first classified neighbouring relay nodes and means for establishing connections between the selected neighbouring relay nodes and said relay node. The relay node also comprises a means for upgrading, before the selection of the fixed number of first neighbouring relay nodes, the neighbouring relay nodes determined as being non-accessible or accessible with upgrading in the ad hoc network from said relay node to make them able to be selected.

According to one characteristic of the invention, the means for establishing a fixed number of connections between the neighbouring relay nodes are radio communication units operating as mobile terminals to be registered and connected to the selected neighbouring relay stations.

Finally, the invention relates to a computer program that can be implemented in a relay node, said program comprising instructions which, when the program is run in said relay node, perform the management of the establishment of a fixed number of connections between detected neighbouring relay nodes in order to form an ad hoc network with wide coverage, according to the method of the invention.

BRIEF DESCRIPTION OF THE DRAWINGS

Other features and advantages of the present invention will become more clearly apparent from reading the following description of a number of embodiments of the invention given as non-limiting examples, with reference to the corresponding appended drawings in which:

FIGS. 3 and 4 are algorithms of a method for managing connections of a relay node according to the invention.

The various elements shown in the various figures retain the same references, unless otherwise specified.

DETAILED DESCRIPTION OF THE DISCLOSURE

Figure 1:
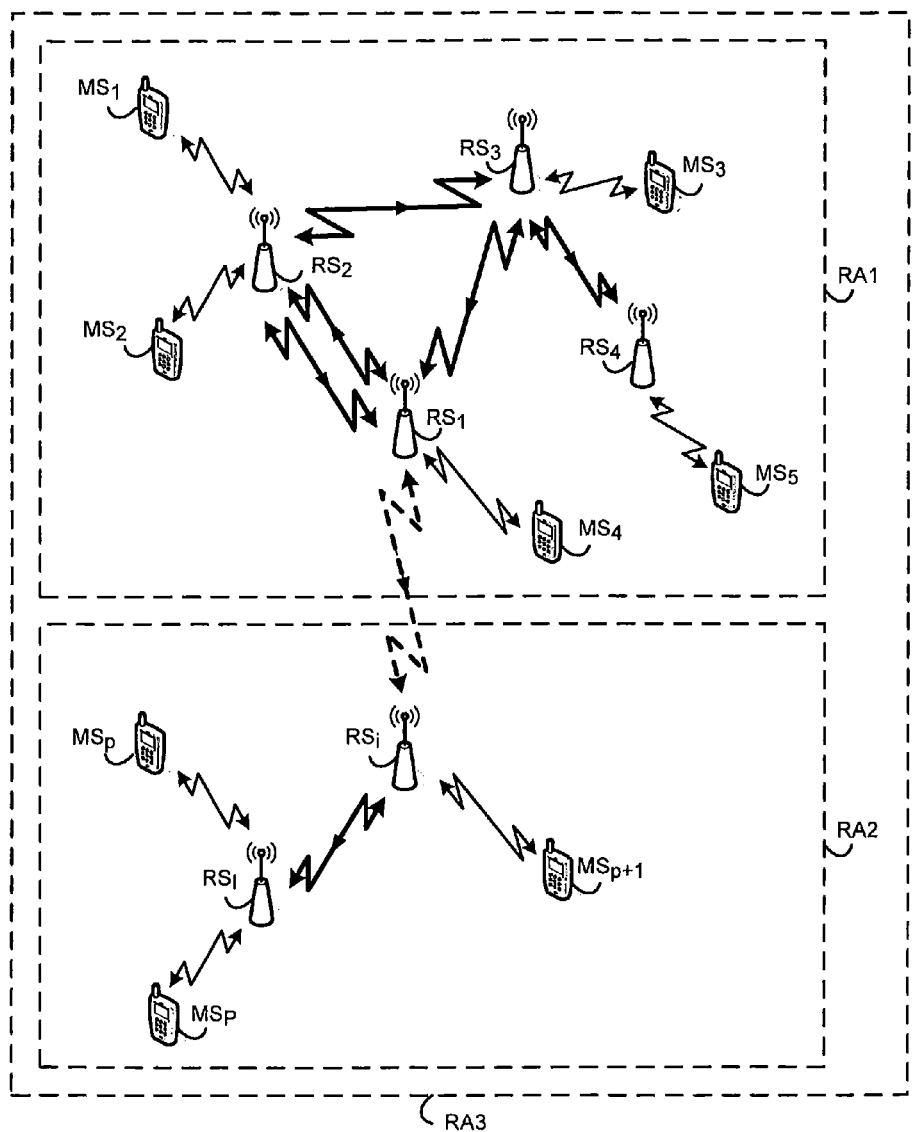
FIG. 1 shows an ad hoc communication system according to the invention.

Referring to FIG. 1, an exemplary communication system according to the invention comprises one or more ad hoc networks RA1 and RA2 formed by a number of relay stations $RS_1$ to $RS_1$, also called relay nodes. Each ad hoc network, for example RA1, is formed by one or more relay stations, $RS_1$ to $RS_4$ in the example, communicating by radio channel directly with one another or indirectly via other relay stations. A relay station is a semi-mobile equipment item, for example mounted in a parked vehicle, such as a fire truck or a police car, or placed at the top of a building. Each relay station establishes bidirectional connections with nearby mobile stations, such as mobile terminals for example, and redirects data particularly in the ad hoc network from a source mobile station to a destination mobile station that may be registered with another relay station of the same network, the mobile stations not communicating directly with one another. The relay stations are adapted to transmit and receive radiofrequency signals to mobile stations and to the relay stations, called neighbouring relay stations, included in a given coverage area.

The invention more particularly relates, in each relay station, to the management of the bidirectional links to be established with other neighbouring relay stations included in a given coverage area. In normal operation, each relay station requests to directly set up, at most, N links—also called connections—with N distinct neighbouring relay stations, which have been previously classified and selected by the relay station—hereinafter in the description called current relay station—according to specific parameters characterizing said neighbouring relay stations. In the exemplary embodiment of the invention described hereinafter in the description, the parameter for classifying and selecting neighbouring relay stations corresponds to the spectral efficiency specific to each neighbouring relay station and measured from the current relay station. Other parameters may be considered.

The communication system according to the example comprises a number of distinct ad hoc networks which do not communicate with one another. The relay stations of one network do not communicate with the relay stations of the other network, either because they are too far apart and are not detected, or because no relay station of one of the two networks is connected with at least one relay station of the other network, which is the case, for example, when all the N links of the nearby relay stations of the two networks are busy. Thus, no mobile station included in one of the two networks communicates with a mobile station of the other network.

The aim of the present invention is therefore to optimize, in each current relay station, the management of the N links to be established with other neighbouring relay stations to widen the coverage of the ad hoc network. To do this, each current relay station selects N first neighbouring relay stations from a set of M neighbouring relay stations detected according to a specific criterion by the current relay station and classified according to a specific parameter. A relay station is considered to be accessible by the current relay station when a link, or a path of links between several relay stations, is established between the two stations and enables them to communicate with one another. When a detected neighbouring relay station is identified as non-accessible from the current relay station, the current relay station upgrades, in the set of neighbouring relay stations, the non-accessible relay station so that it has the possibility of being selected. After classification, if the relay station is part of the N first relay stations, it is selected and a bidirectional link, said to be marked, is established between the upgraded relay station and the current relay station. The marked link belongs to the N links established by the current relay station and has the advantage of widening the ad hoc network by interconnecting the ad hoc network containing the current relay station with the ad hoc network containing the upgraded and selected relay station so as to form only a single ad hoc network with wider coverage.

Referring to FIG. 1, two relay stations $RS_1$ and $RS_i$ belonging respectively to the two distinct ad hoc networks RA1, RA2, and being fairly close to one another so that at least one of the two relay stations detects the presence of the other, will be connected via a marked bidirectional link, represented in FIG. 1 by a dotted line two-way arrow. To do this, if the N links from the relay station $RS_1$ are busy, the relay station $RS_1$ will try to release one of its links already established with another relay station by upgrading the detected neighbouring relay station $RS_i$ and connecting to it via the marked link. This marked link has the advantage of interconnecting the two ad hoc networks RA1 and RA2 to form a single ad hoc network RA3 with wider coverage and thus enables the mobile stations of the network RA3 to communicate.

An exemplary embodiment of the invention is described with reference to FIGS. 2 to 4. In this example, the parameter for selecting and classifying the neighbouring relay stations detected by the current relay station comprises the spectral efficiency specific to each neighbouring relay station, measured by the current relay station. The upgrading of a neighbouring relay station identified as non-accessible by the current relay station in the network is performed by an uprating of the measured spectral efficiency specific to that neighbouring relay station by adding the said measured spectral efficiency to a given value.

Since all the relay stations are equivalent for the invention, reference will be made hereinafter in the description to a given relay station RSc shown in FIG. 2, belonging to the set of the I+1 relay stations of the communication system and hereinafter in the description called current relay station. The current relay station RSc is a base station BS incorporating at most N radio connection units $UC_1$-$UC_N$ operating as mobile stations to be connected to other neighbouring relay stations. The base station BS comprises a communication interface IC, a detection unit UD, a management unit UG and a storage unit UM. The elements $UC_1$-$UC_N$, IC, UD, UG and UM included in the current relay station RSc are functional blocks, most of which handle functions that are associated with the invention and may correspond to software modules implemented in at least one processor and/or to dedicated and/or programmable hardware modules.

Each connection unit $UC_n$ of the current relay station RSc behaves as a mobile station to be registered with a neighbouring relay station, for example, according to the IEEE 802.16j standard and set up a bidirectional radio link between the connection unit $UC_n$ and the communication interface of the neighbouring relay station.

The radio communication interface IC of the current relay station RSc receives and processes the registration requests from connection units of other neighbouring relay stations. A bidirectional link between two relay stations is established between a connection unit $UC_n$ of a first relay station and the communication interface IC of the second relay station and/or vice versa. Thus, two distinct bidirectional links can be established between the two relay stations. The communication interface IC of the current relay station RSc also receives and processes the registration requests from mobile stations included in a given coverage area.

The detection unit UD of the station RSc detects the presence of M neighbouring relay stations $RSv_1$ to $RSv_M$ located in the coverage area of the current relay station RSc-M being an integer number varying in time according to the number of neighbouring relay stations located in proximity to the current relay station RSc. For example, the detection is implemented by means of the transmission and reception of synchronization data via the communication interface IC. The detection unit UD supplies to and receives from the other neighbouring relay stations all the data necessary for a complete synchronization, such as the identities ID-$RSv_1$ to ID-$RSv_M$ of the neighbouring relay stations and data relating to their spectral efficiency. Using these data, the unit UD measures the spectral efficiency $SEv_m$ for each detected neighbouring relay station $RSv_m$. Only the neighbouring relay stations whose spectral efficiency measured by UD is greater than a given spectral efficiency threshold SE1 are considered detected. The detection of the neighbouring relay stations and the measurement of their spectral efficiency are implemented in a known way, for example, by taking into consideration the power of the received signal originating from each neighbouring relay station or the signal-to-noise ratio of the received signal.

The management unit UG comprises, for example, one or more processors controlling the execution of the algorithms A1 and A2 of the method for managing an establishment of connections of a relay station according to the invention. In the current relay station RSc, the management unit UG manages the connection units $UC_1$-$UC_N$ of the relay station RSc to establish links to other neighbouring relay stations. The unit UG selects at most N neighbouring relay stations $RSv_1$ to $RSv_N$ out of the M detected neighbouring relay stations $RSv_1$ to $RSv_M$, with N≤M, and that have the best measured or uprated spectral efficiencies. The current relay station RSc will try to register with the selected neighbouring relay stations via the N connection units. In the case where N≥M, the management unit UG will select the M relay stations. Hereinafter in the description, the following inequality will be assumed: N≤M, since the aim of the present invention is to extend to the maximum the coverage of the ad hoc network by optimally selecting N relay stations out of a greater number of neighbouring relay stations.

The storage unit UM, hereinafter in the description called memory UM, is a storage medium in which programs and user data can be memorized. The memory UM is connected to the management unit UG and comprises volatile and/or non-volatile memories, such as EEPROM, ROM, PROM, RAM, DRAM, SRAM, and other such memories. The algorithms A1 and A2 implementing the method for managing the connections of the relay station RSc are stored in the memory UM. The memory UM also comprises a first list L1 containing data defining the M neighbouring relay stations detected by the unit UD, a second list L2 containing data defining the I relay stations forming the ad hoc network, link state vectors $VC_1$ to $VC_I$ respectively specific to the I relay stations of the network, the link state vector VCc of the current relay station, identities $ID\text{-}MS_1\text{-}ID\text{-}MS_P$ respectively specific to the P mobile stations connected by radiofrequency waves to the communication interface IC of the station RSc-P being an integer number that is variable in time—and an identity ID-RSc of the relay station RSc.

The current relay station RSc identifies each relay station $RS_i$ of the network according to an accessibility indicator $IA_i$ comprising one of the following three distinct states:

$IA_i$=A, indicating that the relay station $RS_i$, neighbouring or not, is accessible from the current relay station RSc, from the communication interface IC or from one of the connection units $UC_n$, one or more links established in the network linking the two stations $RS_i$ and RSc directly or indirectly via other relay stations of the network, $IA_i$=AS, indicating that the neighbouring relay station $RS_i$ has been upgraded by the current relay station RSc and that a marked link has been established directly between the current relay station RSc and the relay station $RS_i$, and $IA_i$=NA, indicating that the relay station $RS_i$, neighbouring or not, is non-accessible from the current relay station RSc. No link in the network links the current relay station RSc to the relay station $RS_i$.

Based on these accessibility indicators specific to the relay stations defined in the lists L1 and L2, the management unit UG decides whether or not to upgrade a neighbouring relay station.

The list L1 defines, at a given instant, a classification of the neighbouring relay stations $RSv_1$ to $RSv_M$ detected by the detection unit UD and whose respective measured spectral efficiencies are greater than the spectral efficiency threshold SE1. The list L1 comprises in particular for each $RSv_m$ of these neighbouring relay stations, the following set of elements—with $1 \leq m \leq M$:

an identity $ID\text{-}RSv_m$ of the station $RSv_m$, an accessibility indicator $IAv_m$ of the station $RSv_m$ relative to the current relay station RSc, and a total spectral efficiency $SETv_m = SEv_m + MJv_m$ of the station $RSv_m$, with $SEv_m$ being the measured spectral efficiency of $RSv_m$ and $MJv_m$ being an uprating that may be equal, depending on the state of the associated accessibility indicator $IAv_m$, either to a zero value, or to a given value D greater than zero. Thus:

for $IAv_m$=A: $MJv_m$=0, the neighbouring relay station $RSv_m$ is not upgraded since it is directly or indirectly accessible to the current relay station RSc, for $IAv_m$=NA: $MJv_m$=D, the neighbouring relay station $RSv_m$ is upgraded since it is currently non-accessible from the current relay station RSc, no link is established between the two stations, and for $IAv_m$=AS: $MJv_m$=D, the neighbouring relay station $RSv_m$ is upgraded since it is only accessible with uprating, also said to be accessible with upgrading, from the current relay station RSc via a marked link between the two stations. If this marked link is disconnected, the neighbouring relay station $RSv_m$ is not connected to any other relay station of the ad hoc network containing the current relay station RSc and therefore no longer forms part of this network. The neighbouring relay station therefore becomes non-accessible.

The value D may be a percentage of the spectral efficiency threshold SE1. As a variant, the value D may be chosen according to the minimum rate guaranteed for interconnecting two ad hoc networks via a marked link. The value D is defined according to the characteristics of the ad hoc network required by the network operators. The optimum value of D should be a trade-off between the stability of the network and the extent of the network coverage. For a high value of D, a large number of non-accessible neighbouring relay stations are upgraded, involving a high interconnection between the ad hoc networks, that is to say, a wide network coverage. For a low value of D, a smaller number of non-accessible neighbouring relay stations are upgraded, involving a low interconnection between the ad hoc networks.

The sets of elements in the list L1 respectively defining the detected neighbouring relay stations are classified in descending order according to the value of the associated total spectral efficiencies $SETv_1$ to $SETv_M$. The management unit UG will select the first N relay stations that respectively have the N best total spectral efficiencies. When the current relay station RSc arrives in the ad hoc network, all the neighbouring relay stations are initialized in the list L1 as non-accessible, the associated accessibility indicators being forced to the "NA" state. Similarly, all the associated total spectral efficiencies are initially equal to the measured spectral efficiencies: $SETv_1 = SEv_1$ to $SETv_M = SEv_M$.

The list L2 defines, at a given instant, all the I relay stations of the ad hoc network identified at that instant by the current relay station RSc-I being an integer number that is variable in time. The list L2 is representative of the topology of the network at that given instant and comprises, for each identified relay station $RS_i$, the following set of elements—with $1 \leq i \leq I$:

the identity $ID\text{-}RS_i$ of the relay station $RS_i$, the accessibility indicator $IA_i$ associated with the relay station $RS_i$ and defined relative to the current relay station RSc, the identities $ID\text{-}MS_{1,i}\text{-}ID\text{-}MS_{P,i}$ of the P mobile stations connected to the communication interface IC of the relay station $RS_i$, and at least a network access identity relative to an identity $ID\text{-}RSv_n$ of a neighbouring relay station directly connected to the current relay station RSc via a connection unit $UC_n$ and from which the relay station $RS_i$ is indirectly or directly accessible from the current relay station RSc, the relay station $RS_i$ possibly being one of the N connected neighbouring relay stations $RSv_n$. As a variant, the network access identities also include identities of neighbouring relay stations $RSv_n$ connected to the current relay station RSc by the communication interface IC and from which the relay station $RS_i$ is directly or indirectly accessible from the current relay station RSc. In all cases, if the accessibility indicator $IA_i$=NA indicates that the relay station $RS_i$ is non-accessible from the current relay station RSc, no network access identity relative to the relay station $RS_i$ is included in the list L2.

The list L2 is established and modified according to the link state vectors $VC_1$ to $VC_I$ constructed respectively by the relay stations of the network, transmitted from relay station to relay station in the ad hoc network and stored upon their receipt in the memory UM of each relay station of the network. Each vector $VC_i$ associated with a relay station $RS_i$ comprises in particular the following elements:

a timestamp datum giving information on the date and time of construction of the vector, a vector validity period, after which the vector is no longer valid, the identity $ID\text{-}RS_i$ of the relay station $RS_i$, that constructed the vector, the identities $ID\text{-}MS_{1,i}$ to $ID\text{-}MS_{P,i}$ of the mobile stations connected to the communication interface IC of the relay station $RS_i$, the identities ID-RSv$_{1,i}$ to ID-RSv$_{N,i}$ of the neighbouring relay stations RSv$_{1,i}$ to RSv$_{N,i}$ directly connected to the relay station RS$_i$ via the connection units UC$_1$-UC$_N$ of the station RS$_i$, and the accessibility indicators IAv$_{1,i}$ to IAv$_{N,i}$ respectively of the neighbouring relay stations RSv$_{1,i}$ to RSv$_{N,i}$ directly connected to the relay station RS$_i$ and indicating whether these neighbouring relay stations are accessible "A" or accessible with upgrade "AS" from the relay station RS$_i$.

The spectral efficiency SEv$_{n,i}$ of each station RSv$_{n,i}$, measured by the relay station RS$_i$ may also be included in the vector VC$_i$.

Figure 2:
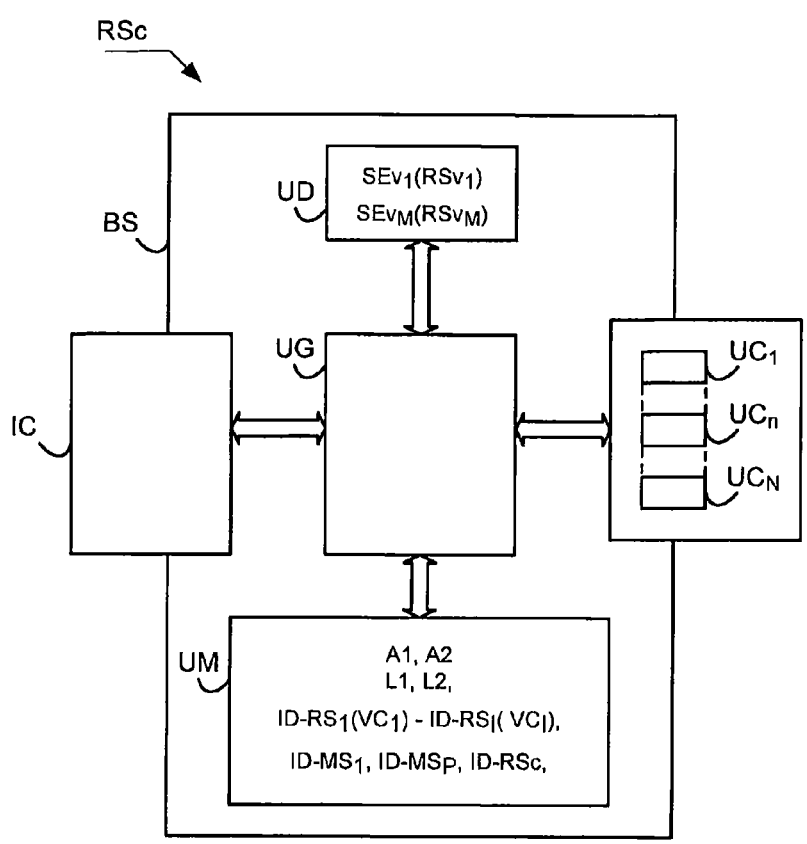
FIG. 2 shows a block diagram of a relay node according to the invention.

Referring to the example of FIG. 2, the current relay station RSc constructs its link state vector VCc. This link state vector includes in particular the identities ID-RSv$_1$ to ID-RSv$_N$ of the neighbouring relay stations RSv$_1$ to RSv$_N$ with which the station RSc has established bidirectional links from the connection units UC$_1$ to UC$_N$, and the associated accessibility indicators IAv$_1$ to IAv$_N$. Once constructed, the vector VCc is stored in the memory UM. The vector VCc is transmitted to the neighbouring relay stations RSv$_1$ to RSv$_N$ via the connection units UC$_1$ to UC$_N$. The current relay station RSc may also transmit its link state vector VCc to the connected neighbouring relay stations from the communication interface IC.

The method for managing connections in a relay station is broken down into two specific algorithms A1 and A2 executed by the management unit UG of the station RSc. The first algorithm A1, shown in FIG. 3, is activated when the current relay station RSc arrives in the ad hoc network and comprises steps S1 to S8. The second algorithm A2, shown in FIG. 4, is activated at the end of the last step of the first algorithm A1 and will be active as long as the relay station RSc is present in the ad hoc network. The second algorithm A2 comprises the steps E1 to E11, and implements the management of the N connection units in particular according to the updated topology of the ad hoc network.

The algorithms are described hereinbelow in a more detailed manner according to an exemplary embodiment that does not limit the scope of the claims of the invention.

Referring to FIG. 3, when the current relay station RSc arrives in the network, in the step S1, the detection unit UD of the station RSc detects neighbouring relay stations RSv$_1$ to RSv$_M$ present in proximity to the current relay station. The unit UD receives from these relay stations, and for each of them, the identity of the station ID-RSv$_m$ and data concerning the spectral efficiency of the station. Based on these data, the detection unit UD measures, for each neighbouring relay station RSv$_m$, its spectral efficiency SEv$_m$ and considers the station RSv$_m$ to be detected if the measured spectral efficiency is greater than the spectral efficiency threshold SE1.

In the step S2, the management unit UG establishes the list L1 of the detected neighbouring relay stations. The unit UG writes, in the list L1, for each relay station RSv$_m$, its identity ID-RSv$_m$ received previously, its total spectral efficiency SETv$_m$ equal, in this step, to the measured spectral efficiency SEv$_m$ of the station RSv$_m$, and its accessibility indicator IAv$_m$ indicating, in this step, that the station RSv$_m$ is non-accessible from the station RSc: IAv$_m$=NA. After all the sets of elements respectively defining all the neighbouring relay stations RSv$_1$, RSv$_M$ have been written into the list L1, or as and when they are written into the list L1, the management unit UG classifies them in descending order according to the corresponding total spectral efficiencies SETv$_m$=SEv$_m$. No uprating is added to the measured spectral efficiencies during the execution of this first algorithm: MJv$_1$=0 to MJv$_M$=0. The classified list L1 is stored in the memory UM. According to an exemplary implementation of the classification, the sets of elements respectively defining the neighbouring relay stations are checked off successively in the list L1 in descending order of their associated total spectral efficiency and are written in this order in an auxiliary list. At the end of the classification operation, the auxiliary list is considered as the new list L1 and is saved in the memory UM by overwriting the old list L1.

In the step S3, the unit UG selects the N relay stations RSv$_1$ to RSv$_N$ from the M neighbouring relay stations RSv$_1$ to RSv$_M$ present in the list L1. More particularly, the management unit UG selects from the classified list L1 the identities of these neighbouring relay stations that have the best total spectral efficiencies, consequently the best measured efficiencies. These relay stations are called selected relay stations.

In the step S4, the management unit UG controls the establishment of the N links between, respectively, the connection units UC$_1$ to UC$_N$ of the current relay station and the communication interfaces of the previously selected neighbouring relay stations. According to a known embodiment, each connection unit UC$_n$ of the relay station RSc behaves as a mobile station and will try to connect to a selected neighbouring relay station by registering with it. If the establishment of a connection fails, the management unit UG deselects said neighbouring relay station and selects from the list L1 the next neighbouring relay station not yet selected to try to establish a bidirectional link with it. This relay station will in turn become selected.

In the step S5, after each establishment of a link or after the establishment of all the links between the units UC$_1$ to UC$_N$ of the current relay station and the communication interfaces of the selected neighbouring relay stations RSv$_1$ to RSv$_N$, according to a chosen embodiment, the management unit UG modifies in the list L1 the accessibility indicators IAv$_1$ to IAv$_N$ respectively associated with the relay stations RSv$_1$ to RSv$_N$ that are in the state "A", indicating that the neighbouring stations are accessible without upgrading from the current relay station, in this step. In the list L1, the accessibility indicators of the other unselected and unconnected neighbouring relay stations remain in the non-accessible state "NA".

In the step S6, the management unit UG constructs the link state vector VCc of the current relay station RSc according, on the one hand, to elements of the list L1, and, on the other hand, to other data stored in the memory UM. In the list L1, the management unit UG reads the elements relating to the N neighbouring relay stations directly connected to the station RSc via the connection units UC$_1$ to UC$_N$ and writes, for each, their identity ID-RSv$_1$ to ID-RSv$_N$ in the vector VCc and the associated accessibility indicator IAv$_1$ to IAv$_N$. The unit UG may also write, in the vector VCc, the measured spectral efficiencies of these N relay stations SEv$_1$ to SEv$_N$. In the memory UM, the management unit UG reads the identities ID-MS$_1$ to ID-MS$_P$ of the P mobile stations MS$_1$ to MS$_P$ which are connected to the communication interface IC of the station RSc and the identity ID-RSc of the relay station RSc, and writes these identities in the vector VCc. The management unit UG also writes in the vector VCc a timestamp datum generated by the unit UG and corresponding to the date and time of creation of the vector, and a validity period for the vector. The vector VCc is then stored in the memory UM.

In the step S7, the management unit UG establishes the list L2 according to the elements included in the link state vector VCc of the current relay station. When this first algorithm is executed, the list L2 comprises only the elements relating to the neighbouring relay stations connected to the current relay station, the identities ID-RS$_i$ and the network access identities of the relay stations $RS_i$ in L2 being identical to the identities ID-$RSv_n$ of the relay stations $RSv_n$ included in the vector VCc. As a variant, the list L2 is established according to the elements relating to the connected neighbouring relay stations $RSv_1$ to $RSv_N$ included in the list L1. According to this variant, the step S7 may be executed between the step S5 and the step S6.

In the step S8, the management unit UG transmits the vector VCc to each neighbouring relay station directly linked to the current relay station by the connection units $UC_1$ to $UC_N$ and by the communication interface IC. At the end of the step S8, the management unit UG of the station RSc deactivates the algorithm A1 and activates the algorithm A2.

Referring to FIG. 4, the execution of the algorithm A2 by the management unit UG makes it possible to optimize, for each relay station, the establishment of the N links from the connection units to other relay stations selected in particular according to the updated network topology.

Thus, the steps E1 to E3 implement the reception and processing of the link state vectors $VC_1$ to $VC_I$ originating from the relay stations of the network. In the step E4, the list L2 representing the topology of the ad hoc network is updated according to the link state vectors $VC_1$ to $VC_I$ and VCc. In the steps E5 to E7, the list L1 is updated or replaced by a new list L1 established according, in the step E5, to a new detection of the neighbouring relay stations, in the step E6, to the reading of the updated list L2 and in the step E7, to the determination of the total spectral efficiencies of the detected neighbouring relay stations. In the steps E8 to E11, the first N relay stations of the updated list L1 are selected, the N links are established, and the link state vector VCc of the relay station is constructed and sent to the neighbouring relay stations connected to the current relay station.

The algorithm is described hereinbelow in a more detailed manner according to an exemplary embodiment that does not limit the scope of the claims of the invention.

In the step E1, the communication interface IC or one of the connection units $UC_1$ to $UC_N$ of the current relay station RSc receives a link state vector $VC_i$ originating directly or indirectly from one of the relay stations $RS_i$ of the network.

In the step E2, the management unit UG of the current relay station RSc checks whether the vector $VC_i$ is valid. For example, the vector $VC_i$ is valid if the validity period defined in the vector $VC_i$ has not elapsed. The vector $VC_i$ is also valid if no other vector $VC_i$ including the same identity ID-$RS_i$ of a relay station $RS_i$ is stored in the memory UM, or, in the case where a vector $VC_i$ already stored in UM includes the same identity ID-$RS_i$, if the comparison of the timestamped data of the two vectors indicates that the received vector is more recent than the stored vector. As soon as the vector $VC_i$ is checked and found to be valid, it is stored in the memory UM by overwriting the old vector $VC_i$, if necessary. The unit UG may also store in the memory UM, in association with the received vector $VC_i$ a network access identity corresponding to the identity of the neighbouring relay station connected to the current relay station RSc via the interface IC or via one of the connection units $UC_n$ and which has routed the vector $VC_i$ to the current relay station RSc. A number of different network access identities may be stored in association with the vector $VC_i$ in the memory UM. In practice, one and the same vector $VC_i$ may be conveyed via a number of different link paths.

If the vector $VC_i$ is not valid, the management unit UG does not process it and the subsequent steps are not executed. The unit UG repeats the execution of the step E1.

If the vector $VC_i$ is valid, in the step E3, it is transmitted to other relay stations of the network from the communication interface IC for neighbouring relay stations RSv, and from the connection units $UC_1$ to $UC_N$ for the neighbouring relay stations already selected and connected $RSv_1$ to $RSv_N$.

The steps E1 to E3 are repeated each time a link state vector is received throughout the period during which the algorithm A2 is activated.

As a variant, each time a state vector is received, the unit UG stores it in a buffer memory. The steps E1 to E3 are activated when triggered on a particular event, such as the end of an elapsed time period or at the end of the step E11, to process the received link state vectors stored in the buffer memory.

In the step E4, the management unit UG analyses each received link state vector $VC_1$ to $VC_I$ and the link state vector VCc of the current relay station RSc and updates the list L2 according to these vectors. During this step, the management unit UG of the current relay station RSc identifies the network accessibility, that is to say the accessibility indicator, for each relay station of the network, and more particularly for each neighbouring relay station.

According to an exemplary embodiment, the list L2 is updated each time a particular event is triggered, such as an elapsed time period t. The management unit UG freezes the memory UM, for example by duplicating all the state vectors contained in the memory UM and the list L2 in an auxiliary memory, by performing the processing on the data of the list L2 included in the auxiliary memory and by storing, at the end of the step E4, the list L2 in the memory UM, by overwriting the old list L2, if necessary. The timer t is reset by the management unit UG at the end of the execution of the step E4, or upon the execution of a subsequent step.

According to another embodiment, the list L2 may be updated each time a valid vector is received in the current relay station, the management unit not in this case managing the timer t.

For each link state vector $VC_i$ checked valid and analysed by the unit UG according to the other stored link state vectors, the unit UG writes or updates in L2 the elements defining the station $RS_i$ defined by the vector $VC_i$, but also elements defining the relay stations $RSv_{1,i}$ to $RSv_{N,i}$ included in the vector $VC_i$.

On reading, in each vector $VC_i$, an identity ID-$RS_i$ of a relay station $RS_i$ or an identity ID-$RSv_{n,i}$ of a neighbouring relay station of the station $RS_i$, the management unit UG checks, and if necessary adds or modifies, in the list L2, a set of elements defining the identified relay station and comprising:

a new identity ID-$RS_i$ or ID-$RS_{n,i}$ of the identified station $RS_i$ or $RS_{n,i}$, if the identity is not present in the list L2,
 the accessibility indicator $IA_i$ or $IA_{n,i}$ of the identified station, the state of which depends on the states of the indicators of the identified station that are potentially included in the link state vectors $VC_1$-$VC_I$; and VCc analysed by the current station,
 for the identified station $RS_i$, the identities ID-$MS_{1,i}$ to ID-$MS_{P,i}$ of the mobile stations connected to the station $RS_i$, and which are contained in the vector $VC_i$, and
 at least one network access identity relating to the identity of the neighbouring relay station connected to the current relay station RSc and stored in association with the vector $VC_i$ in the memory UM or the auxiliary memory, depending on the case. The identity or identities of one or more of said neighbouring relay stations, these identities being stored in association with link state vectors each comprising the accessibility indicator $IA_i$ or $IA_{n,i}$ in the accessible "A" or accessible with upgrading "AS" state, can be defined as network access identities.

More particularly, in the list L2, the state of the network accessibility indicator $IA_i$ or $IA_{n,i}$ of the identified station $RS_i$ or $RS_{n,i}$ will partly depend on the state of this same indicator, if it is present, in the received link state vectors $VC_1$-$VC_I$ of the relay stations of the network and in the link state vector VCc of the current station.

The management unit UG sets said indicator $IA_i$ or $IA_{n,i}$ to the accessible state "A" in the list L2:

- if the vector of the identified relay station is stored and analysed by the current relay station, thus indicating that the identified relay station is indeed accessible since the current relay station has received said link state vector, or
- if, in at least one of the vectors $VC_1$-$VC_I$, VCc analysed by the current relay station, the network accessibility indicator of the identified station indicates said identified station to be accessible "A", or
- if, in the link state vector VCc of the current relay station, the network accessibility indicator of the identified relay station indicates said identified station to be non-accessible "NA" and, in at least one of the other received link state vectors $VC_1$-$VC_I$, the network accessibility indicator of the identified station indicates said station to be accessible with upgrading "AS".

The management unit UG sets the accessibility indicator $IA_I$ or $IA_{n,i}$ to the accessible with upgrading state "AS" in the list L2, if, in the link state vector VCc of the current relay station, the network accessibility indicator of the identified relay station indicates said station to be accessible with upgrading "AS" and, in the other received link state vectors $VC_1$-$VC_I$, the network accessibility indicator of the identified station indicates said station to be non-accessible "NA" or accessible with upgrading "AS". Such a relay station identified by the current relay station as accessible with upgrading is a relay station $RSv_n$ neighbouring the current station and is only connected to the current relay station via a marked link. This relay station $RSv_n$ must therefore remain upgraded.

The management unit UG sets said indicator to the non-accessible state "NA" in the list L2, if the identity ID-$RS_i$, ID-$RSv_{m,i}$ of the identified relay station is not present in any of the analysed link state vectors $VC_1$-$VC_I$ and VCc.

The simultaneous reading of the link state vectors by the management unit UG to define the link state indicators can be performed in a known manner using pointers.

The list L2, once updated, is stored in the memory UM.

The steps E5 to E7 correspond to the updating of the list L1 according, in the step E5, to a new detection of the neighbouring relay stations, in the step E6, to the reading of the updated list L2, and, in the step E7, to the determination of the total spectral efficiencies of the detected neighbouring relay stations. According to one embodiment of the invention, described hereinbelow, the updating of the list L1 comprises the formation of a new list L1 which is initially empty and is completed as the steps E5 to E7 progress. The new list L1 is stored in the memory ME by overwriting the old list L1.

In a manner similar to the steps S1 and S2 described previously, in the step E5, the detection unit UD of the current relay station RSc detects the neighbouring relay stations $RSv_1$ to $RSv_M$ and measures, for each of them, their spectral efficiency $SEv_1$ to $SEv_M$. Then, the management unit UG completes the list L1, initially empty, with the duly detected neighbouring relay stations. Elements are written into the list L1 for each neighbouring relay station detected, that is to say, when its measured spectral efficiency is greater than the spectral efficiency threshold SE1. The management unit initializes the upratings $MJv_1$ to $MJv_M$ in the list L1 with the zero value and the accessibility indicators $IAv_1$ to $IAv_M$ with the state "NA", the M neighbouring relay stations then being considered to be non-accessible. These elements $MJv_1$ to $MJv_M$ and $IAv_1$ to $IAv_M$ are updated in the step E6, on reading the updated list L2.

In the step E6, the management unit updates elements of the list L1 according to the updated elements in the list L2 for any relay station $RSv_m$/$RS_i$ identified in the two lists ID-$RSv_m$=ID-$RS_i$. For each relay station identified in the two lists and being indicated as accessible "A" or accessible with upgrading "AS" in the list L2, the accessibility indicator $IA_i$=A or AS in the list L2 is copied identically into the list L1: $IAv_m$=A or AS. For each accessibility indicator $IAv_m$ in the list L1 indicating that the associated neighbouring relay station $RSv_m$ is not accessible "NA" or is accessible with upgrading "AS" to the current relay station RSc, the management unit UG upgrades the relay station $RSv_m$ by modifying the associated uprating $MJv_m$ to the fixed value D: $MJv_m$=D.

In the step E7, the management unit UG determines the total spectral efficiencies in the list L1. Each total spectral efficiency is determined according to the following equation: $SETv_m$=$SEv_m$+$MJv_m$.

After updating each set of elements defining each neighbouring relay station in the list L1, or as and when they are updated, the management unit UG classifies them in descending order according to the previously determined total spectral efficiency values $SETv_m$=$SEv_m$+$MJv_m$. Once the list L1 is classified, it is stored in the memory UM. In the list L1, a neighbouring relay station $RSv_m$ indicated as non-accessible $IAv_m$=NA or accessible with upgrading $IAv_m$=AS is, or remains, upgraded. An upgraded relay station may thus form part of the first N relay stations listed in the list L1.

In a manner similar to the step S3, the management unit UG selects, in the step E8, the first N neighbouring relay stations $RSv_1$ to $RSv_N$ from the M neighbouring relay stations $RSv_1$ to $RSv_M$ written in the list L1.

In the step E9, in a manner similar to the steps S4 and S5 described previously, the management unit UG controls the establishment of the N links from each connection unit $UC_1$ to $UC_N$ of the current relay station RSc to the communication interfaces of the previously selected neighbouring relay stations. More particularly, the management unit UG disconnects the links to the neighbouring relay stations which are no longer selected and establishes new links to newly selected neighbouring relay stations. The links to the neighbouring stations that are selected and already connected are not modified.

After each establishment of a link or after the establishment of all the links between the units $UC_1$ to $UC_N$ and the selected neighbouring relay stations $RSv_1$ to $RSv_N$, the management unit UG modifies, in the list L1, the accessibility indicators $IAv_1$ to $IAv_N$ respectively associated with the relay stations $RSv_1$ to $RSv_N$, indicating that these stations are accessible "A" or accessible with upgrading "AS" to the current relay station RSc. Each indicator $IAv_n$ of an upgraded and connected relay station, having the uprating $MJ_n$=D, is set to be accessible with upgrading state "AS". In the list L1, the accessibility indicators of the unselected and unconnected neighbouring relay stations are in the non-accessible state "NA".

In the step E10, similar to the step S6 described previously, the management unit UG constructs the link state vector VCc of the current relay station according, on the one hand, to the elements of the list L1 and, on the other hand, to data stored in the memory UM. This new link state vector VCc is stored in the memory UM by overwriting the old vector VCc and will be taken into account during a new updating of the list L2 in the step E4.

Based on the elements of the list L1, the unit UG updates elements of the list L2, more particularly the network accessibility of the neighbouring relay stations previously connected to the current relay station. This updating of the topology of the network described in the list L2 is necessary to the establishment of communications between the mobile stations of the ad hoc network.

In the step E11, the management unit UG transmits the vector VCc to each neighbouring relay station directly linked to the current relay station by the connection units $UC_1$ to $UC_N$ and by the communication interface IC. At the end of the step E11, the management unit UG executes the step E1 again.

The steps E1 to E11 are repeated as long as the current relay station is active.

Other embodiments of the invention can be implemented in each relay station to optimally extend the coverage of the ad hoc network by upgrading the neighbouring relay stations detected and identified as non-accessible or accessible with upgrading in the network, the upgrading of these stations being able to make these stations able to be selected subsequently and being established according in particular to the link state vectors originating from the relay stations forming the ad hoc network. Furthermore, it is obvious to those skilled in the art that the inventive concept described here can be implemented according to several different implementations. The invention and its embodiments are not limited to the examples described previously, but may vary without departing from the scope of the claims.

The invention described here relates to a method, a communication system and at least one relay node such as a relay station, for managing connections with other relay nodes. According to one implementation, the steps of the method of the invention are determined by the instructions of a computer program incorporated in the relay node. The computer program which can be implemented in the relay node comprises program instructions which, when said program is run in the relay node whose operation is then controlled by the execution of the program, perform a relay node connection management in accordance with the method of the invention.

Consequently, the invention also applies to a computer program, in particular a computer program stored on or in a storage medium which can be read by a computer and any data processing device, suitable for implementing the invention. This program may use any programming language, and be in the form of source code, object code, or intermediate code between source code and object code such as in a partially compiled form, or in any other form desirable to implement the method according to the invention. The program can be downloaded into the device via a communication network like the Internet.

The storage medium may be any entity or any device capable of storing the program. For example, the medium may comprise a storage medium on which is stored the computer program according to the invention, such as a ROM, for example a CD ROM or a microelectronics circuit ROM, or even a USB key, or a magnetic storage means, for example a disquette (floppy disc) or a hard disc.

The invention claimed is:

1. A method for managing the establishment of a fixed number of connections between detected neighbouring relay nodes in order to form an ad hoc network with wide coverage, the method being implemented in each current relay node and comprising:

a classification of the neighbouring relay nodes according to spectral efficiency, the neighbouring relay nodes being accessible if their spectral efficiency value is greater than a spectral efficiency threshold value of the current relay node, the neighbouring relay nodes being non-accessible or accessible with upgrading if their spectral efficiency value is less than the spectral efficiency threshold value of the current relay node;

upgrading the non-accessible or accessible with upgrading neighbouring relay nodes by increasing their spectral efficiency values to exceed the spectral efficiency threshold value of the current relay node;

a selection of the fixed number of first classified neighbouring relay nodes from all neighboring relay nodes that now have their spectral efficiency value greater than the spectral efficiency threshold value of the current relay node; and establishing a connection between the selected neighbouring relay nodes and the current relay node.

2. The method according to claim 1, according to which the upgrading of the neighbouring relay nodes identified as non-accessible or accessible with upgrading comprises an uprating of their respective measured spectral efficiencies by adding a given value to have a total spectral efficiency value greater than a spectral efficiency threshold value of the current relay node.

3. The method according to claim 1, according to which, in each current relay node, a link state vector is constructed and comprises at least identities of the neighbouring relay nodes with which the current relay node has established connections, and comprises, for each neighbouring relay node, a network accessibility of said node considered from the current relay node, the link state vector being transmitted to the other relay nodes of the network via the selected and connected neighbouring relay nodes.

4. The method according to claim 1, according to which each current relay node identifies a network accessibility for each neighbouring relay node based on an analysis of the link state vectors of relay nodes forming the ad hoc network, received and validated by the current relay node, and of the link state vector constructed by the current relay node, a neighbouring relay node being identified as:

non-accessible from the current relay node if the identity of the neighbouring relay node is not included in any of the analysed link state vectors, or accessible from the current relay node, if the vector of the neighbouring relay node is analysed by the current relay node, or accessible from the current relay node if, in at least one of the vectors analysed by the current relay node, the network accessibility of the neighbouring relay node indicates said node as being accessible, or accessible from the current relay node if, in the link state vector of the current relay node, the network accessibility of the neighbouring relay node indicates said node as being non-accessible and, in at least one of the other received link state vectors, the network accessibility of the neighbouring relay node indicates said node as being accessible with upgrading, or accessible with upgrading from the current relay node, if, in the link state vector of the current relay node, the network accessibility of the neighbouring relay node indicates said node as being accessible with upgrading and, in the other received link state vectors, the network accessibility of the neighbouring relay node indicates said node as being non-accessible or accessible with upgrading.

5. A relay node capable of managing the establishment of a fixed number of connections to detected neighbouring relay nodes in order to form an ad hoc network with wide coverage, the relay node comprising:

- a means for classifying the neighbouring relay nodes according to spectral efficiency, the neighbouring relay nodes being accessible if their spectral efficiency value is greater than a spectral efficiency threshold value of the relay node, the neighbouring relay nodes being non-accessible or accessible with upgrading if their spectral efficiency value is less than the spectral efficiency threshold value of the relay node;
- a means for upgrading the non-accessible or accessible with upgrading neighbouring relay nodes by increasing their spectral efficiency values to exceed the spectral efficiency threshold value of the relay node;
- a means for selecting a fixed number of first classified neighbouring relay nodes from all neighboring relay nodes that now have their spectral efficiency value greater than the spectral efficiency threshold value of the relay node; and
- a means for establishing connections between the selected neighbouring relay nodes and the relay node.

6. The relay node according to claim 5, in which the means for upgrading upgrades the neighbouring relay nodes identified as non-accessible or accessible with upgrading by adding a given value to their respective measured spectral efficiencies to have a total spectral efficiency value greater than a spectral efficiency threshold value of the relay node.

7. The relay node according to claim 5, comprising a means for constructing a link state vector comprising at least identities of the neighbouring relay nodes with which said relay node has established connections and also comprising, for each neighbouring relay node, a network accessibility of said node considered from the current relay node, the link state vector being transmitted to the other relay nodes of the network via the selected and connected neighbouring relay nodes.

8. The relay node according to claim 5, comprising a means for identifying a network accessibility for each neighbouring relay node on the basis of an analysis of the link state vectors of relay nodes forming the ad hoc network, received and validated by the current relay node and of the link state vector constructed by the current relay node, a neighbouring relay node being identified as:

- non-accessible from the relay node if the identity of the neighbouring relay node is not included in any of the analysed link state vectors, or
- accessible from the relay node, if the vector of the neighbouring relay node is analysed by the relay node, or
- accessible from the current relay node if, in at least one of the vectors analysed by the relay node, the network accessibility of the neighbouring relay node indicates said node as being accessible, or
- accessible from the current relay node if, in the link state vector of the relay node, the network accessibility of the neighbouring relay node indicates said node as being non-accessible and, in at least one of the other received link state vectors, the network accessibility of the neighbouring relay node indicates said node as being accessible with upgrading, or
- accessible with upgrading from the relay node, if, in the link state vector of the relay node, the network accessibility of the neighbouring relay node indicates said node to be accessible with upgrading and, in the other received link state vectors, the network accessibility of the neighbouring relay node indicates said node as being non-accessible or accessible with upgrading.

9. The relay node according to claim 5, in which the means for establishing a fixed number of connections between the neighbouring relay nodes are radiocommunication units operating as mobile terminals to be registered and connected to the selected neighbouring relay stations.

10. A non-transitory storage medium that can be implemented in a relay node to manage the establishment of a fixed number of connections to detected neighbouring relay nodes in order to form an ad hoc network with wide coverage, said program being characterized in that it comprises instructions which, when the non-transitory storage medium is run in said relay node, perform:

- a classification of the neighbouring relay nodes according to spectral efficiency, the neighbouring relay nodes being accessible if their spectral efficiency value is greater than a spectral efficiency threshold value of the relay node, the neighbouring relay nodes being non-accessible or accessible with upgrading if their spectral efficiency value is less than the spectral efficiency threshold value of the relay node;
- an upgrading of the neighbouring relay nodes determined to be non-accessible or accessible with upgrading in the ad hoc network from the relay node to make them able to be selected by increasing their spectral efficiency values to exceed the spectral efficiency threshold value of the relay node;
- a selection of the fixed number of classified neighbouring relay nodes from all neighboring relay nodes that now have their spectral efficiency value greater than the spectral efficiency threshold value of the relay node; and
- an establishment of the connections between the selected neighbouring relay nodes and the relay node.

* * * * *